United States Patent
Shin et al.

(10) Patent No.: US 8,332,770 B2
(45) Date of Patent: Dec. 11, 2012

(54) APPARATUS AND METHOD FOR PROVIDING CHARACTER DELETION FUNCTION

(75) Inventors: Keun-Ho Shin, Suwon-si (KR); Kwang-Yong Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 744 days.

(21) Appl. No.: 12/188,555

(22) Filed: Aug. 8, 2008

(65) Prior Publication Data

US 2009/0044139 A1 Feb. 12, 2009

(30) Foreign Application Priority Data

Aug. 8, 2007 (KR) .................. 10-2007-0079563

(51) Int. Cl.
*G06F 3/048* (2006.01)
(52) U.S. Cl. ...................................... 715/769
(58) Field of Classification Search .............. 715/769
See application file for complete search history.

(56) References Cited

U.S. PATENT DOCUMENTS

| | | | | |
|---|---|---|---|---|
| 3,676,856 | A | * | 7/1972 | Manly ............................ 715/209 |
| 5,260,697 | A | * | 11/1993 | Barrett et al. ................... 345/173 |
| 2007/0157085 | A1 | * | 7/2007 | Peters ............................ 715/531 |

* cited by examiner

*Primary Examiner* — Tuyetlien Tran
*Assistant Examiner* — Peiyong Weng
(74) *Attorney, Agent, or Firm* — The Farrell Law Firm, P.C.

(57) ABSTRACT

An apparatus and a method for providing a character deletion function is provided. A plurality of deletion items having respective designated deletion schemes are displayed, when there is a request for a deletion mode while inputting characters. It is determined if a Drag event occurs after a Press event occurs in an area where one of the plurality of deletion items is displayed. It is determined if a Release event occurs when the Drag event occurs. A deletion function in a deletion scheme corresponding to a deletion item having an area where the Release event occurs is performed when the Release event occurs. Accordingly, a user has convenience with which, when inputting characters, the user receives various deletion schemes and can perform a desired deletion function in a simple way.

11 Claims, 4 Drawing Sheets

APPARATUS AND METHOD FOR PROVIDING CHARACTER DELETION FUNCTION

PRIORITY

This application claims priority under 35 U.S.C. §119(a) to an application entitled "Apparatus and Method for Providing Character Deletion Function" filed in the Korean Intellectual Property Office on Aug. 8, 2007 and assigned Serial No. 2007-79563, the contents of which are incorporated herein by reference.

BACKGROUND OF THE INVENTION

1. Field of the Invention

The present invention relates to a terminal equipped with a touch-screen, and more particularly to an apparatus and a method for providing a character deletion function.

2. Description of the Related Art

Recently, mobile communication terminals, including, for example, a Personal Digital Assistant (PDA), equipped with a QWERTY-type keypad used as a standard for computer keyboards have appeared. Accordingly, a user has convenience in that he/she can easily input a key by using a relevant terminal in the same manner as when he/she uses a computer.

in a conventional QWERTY-type keyboard, a Delete key and a Backspace key are implemented so that a user can perform a deletion function during character editing the Delete key is used in order to delete characters on the right side of a location of a cursor displayed while inputting characters. On the contrary, the Backspace key is used in order to delete characters on the left side of the location of the cursor. The Delete and Backspace keys as described above are used when deleting characters, and are implemented independently of each other in the conventional QWERTY-type keyboard. Accordingly, the user must separately select each of the Delete and Backspace keys in order to delete characters incorrectly input during inputting characters.

In the conventional QWERTY-type keyboard, the Delete and Backspace keys providing the deletion function are configured as separate keys. Accordingly, when the QWERTY-type keyboard is intended to be applied to a terminal equipped with a touch-screen, the application is difficult due to the limited size of the screen. Moreover, whenever deleting characters, the user must input the Backspace key or the Delete key by the number of characters to be deleted. Accordingly, when deleting multiple characters at one time, inconvenience caused by the key input increases.

Due to the problems as described above, there has been a need for a method capable of reducing inconvenience caused by key input during deleting characters and efficiently configuring a keypad.

SUMMARY OF THE INVENTION

The present invention has been made to address at least the above problems and/or disadvantages, and to provide at least the advantages described below. Accordingly, an aspect of the present invention provides an apparatus and a method for providing a function of more quickly and accurately deleting characters to be edited while editing the characters.

According to one aspect of the present invention, a method is provided for providing a character deletion function by a terminal equipped with a touch-screen. A plurality of deletion items are displayed having respective designated deletion schemes when there is a request for a deletion mode while inputting characters. It is determined if a Drag event occurs after a Press event occurs in an area where one of the plurality of deletion items is respectively displayed. It is determined if a Release event occurs when the Drag event occurs. The input characters are deleted in a deletion scheme corresponding to one of the plurality of deletion items having an area where the Release event occurs when the Release event occurs.

According to another aspect of the present invention, an apparatus is provided for providing a character deletion function. The apparatus includes a touch-screen for outputting characters input thereto, displaying a plurality of deletion items having respective designated deletion schemes in a deletion mode, and generating a Press event, a Release event, and a Drag event in response to an input of a user. The apparatus also includes a memory for storing therein deletion schemes respectively corresponding to the plurality of deletion items. The apparatus further includes a control unit for controlling the touch-screen so that the plurality of deletion items are displayed on the touch-screen when there is a request for the deletion mode while inputting characters, determining if a Release event occurs when a Drag event occurs after a Press event occurs in an area where one of the plurality of deletion items are displayed, and deleting the characters output on the touch-screen in a deletion scheme corresponding to one of the plurality of deletion items having an area where the Release event occurs when the Release event occurs.

BRIEF DESCRIPTION OF THE DRAWINGS

The above and other features, aspects, and advantages of the present invention will be more apparent from the following detailed description when taken in conjunction with the accompanying drawings, in which.

DETAILED DESCRIPTION OF THE PREFERRED EMBODIMENTS

Figure 1:
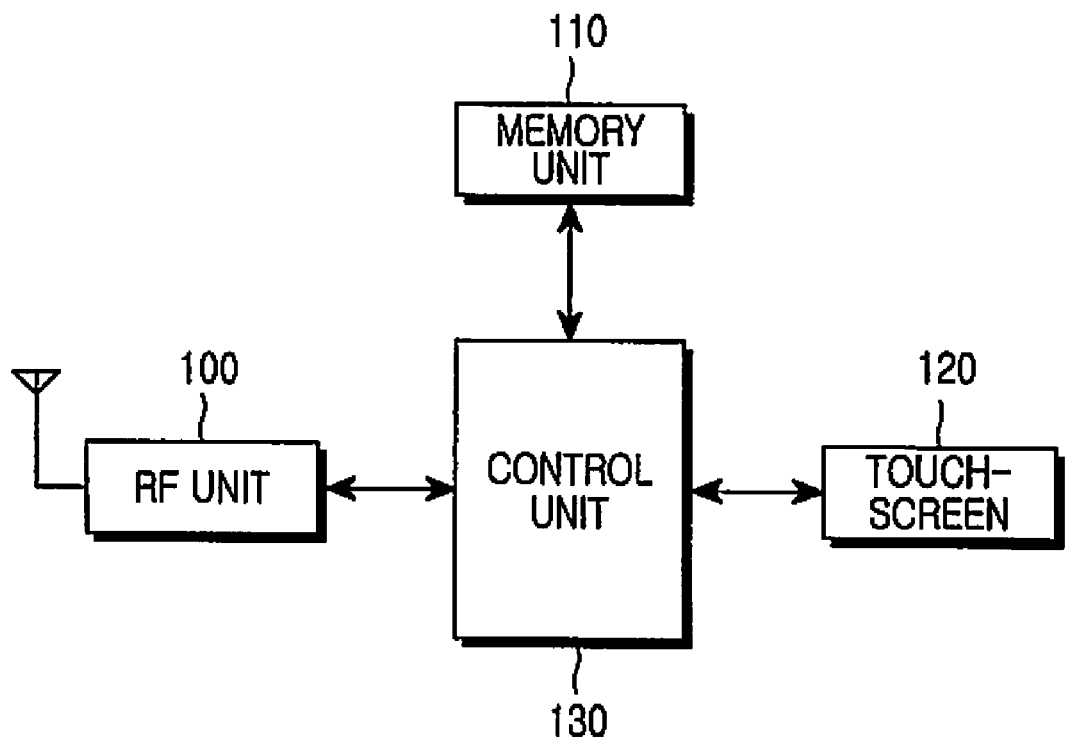
FIG. 1 is a block diagram illustrating a configuration of a terminal for providing a character deletion function according to an embodiment of the present invention.

Preferred embodiments of the present invention are described in detail with reference to the accompanying drawings. It should be noted that similar components are designated by similar reference numerals although they are illustrated in different drawings. Detailed descriptions of constructions or processes known in the art may be omitted to avoid obscuring the subject matter of the present invention.

The present invention provides an apparatus and a method for providing a character deletion function. The method of the invention includes: displaying two or more deletion items whose respective deletion schemes are designated when there is a request for a deletion mode while inputting characters; determining if a Drag event occurs after a Press event occurs in any one of the areas where the deletion items are displayed; determining if a Release event occurs when the Drag event occurs; and performing a deletion function in a deletion scheme corresponding to a deletion item of an area where the Release event occurs when the Release event occurs. Accordingly, when inputting characters, the user receives various deletion schemes and can perform a desired deletion function in a simple way.

Hereinafter, the present invention will be described with reference to FIG. 1, which is a block diagram illustrating a configuration of a terminal for providing a character deletion function according to an embodiment of the present invention.

Referring to FIG. 1, the terminal of the invention includes a Radio Frequency (RF) unit 100, a memory unit 110, a touch-screen 120, and a control unit 130.

First, the RF unit 100 performs the radio communication function of the terminal. The memory 110 includes a Read Only Memory (ROM) and a Random Access Memory (RAM) for storing multiple programs and data therein. Particularly, the memory 110 stores therein Hangul, English, numerals, and special characters (hereinafter, "characters") displayed in a character area of the touch-screen 120 for a keypad function according to an embodiment of the present invention. Also, the memory 110 stores therein deletion schemes respectively corresponding to two or more deletion items displayed on the touch-screen 120.

The touch-screen 120 is a display, which can detect a location of touch when a human hand or an object touches a character or a particular location displayed on a screen thereof, and can then perform particular processing by using stored software. The touch-screen 120 receives touch input from a user and displays expression data under the control of the control unit 130, or displays an operation state of the terminal and multiple pieces of information as icons and characters. Particularly, the touch-screen 120 to which the present invention is applied displays character areas for character input and an input editor window for editing input characters under the control of the control unit 130. Accordingly, the touch-screen 120 outputs a character received as input through the character area to the input editor window, and displays two or more deletion items whose respective deletion schemes are designated while entering a deletion mode. Also, the touch-screen 120 generates a Press event, a Release event, and a Drag event in response to the input of the user in areas where the deletion items are displayed. Herein, the Press event occurs when a particular area is pressed, and the Release event occurs when the pressing of the particular area is released. Also, the Drag event occurs when a Drag input is received from the user in areas displayed on the touch-screen 120. Accordingly, the user can easily select a desired deletion function in the input scheme as described above.

The control unit 130 performs an overall control operation of the terminal. According to an embodiment of the present invention, the control unit 130 determines if there is a request for the deletion mode while inputting characters. Herein, a determination reference may be either the number of times of the occurrence of the Press event in the particular area for entrance into the deletion mode, an elapsed time from a time point of the occurrence of the Press event, or others. However, the determination reference is not limited to these examples and therefore various changes in form and details may be made therein according to embodiments of the present invention.

Meanwhile, if it is determined that there is a request for the deletion mode, the control unit 130 displays two or more deletion items on the touch-screen 120. Then, the control unit 130 determines if a Drag event occurs after a Press event occurs in any one of areas where the deletion items are displayed. When it is determined that the Drag event occurs, the control unit 130 determines if a Release event occurs. If it is determined that the Release event occurs, the control unit 130 deletes characters output in an input editor window of the touch-screen 120 in a deletion scheme corresponding to a deletion item of an area where the Release event occurs. Accordingly, in the present invention, the user has convenience with which he/she can more quickly and efficiently delete desired characters with a simple action when editing characters.

Figure 2:
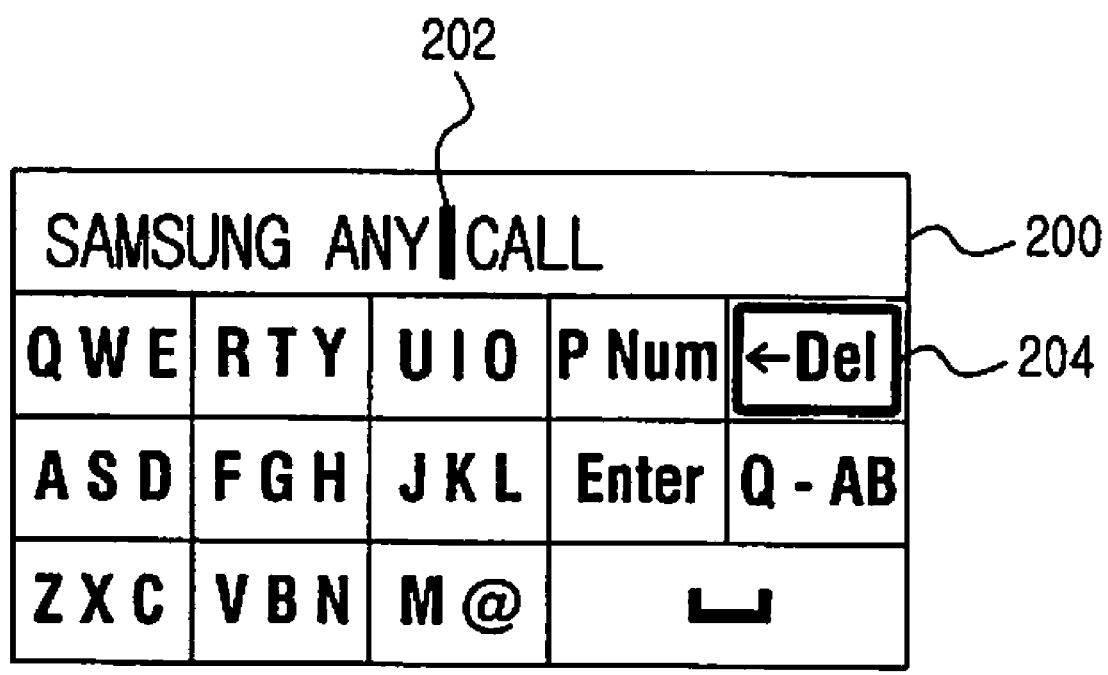
FIG. 2 an illustrative view showing a screen image in a character editing mode for performing a deletion function according to an embodiment of the present invention.

A screen image in a character editing mode for performing a deletion function according to an embodiment of the present invention will be described referring to FIG. 2. In FIG. 2, an input editor window 200 appears in order to output characters received as input from a user in an upper portion of the touch-screen 120. In the input editor window 200, a cursor 202 indicating a location for editing is displayed, so that the user can change a location of the cursor 202 by inputting a direction key or in other ways. Below the input editor window 200, character areas for receiving character input from the user are located. In each of the character areas, relevant characters are displayed in a QWERTY format. Also, in any one area of the touch-screen 120, an area 204 for entrance into a deletion mode (i.e. a deletion mode entrance area 204) is displayed. According to an embodiment of the present invention, the deletion mode entrance area 204 provides deletion items related to a Backspace key and a Delete key providing a deletion function in a QWERTY-type keyboard. Accordingly, the user can receive all deletion functions supported by the terminal through the deletion mode entrance area 204, so that he/she has convenience with which he/she can easily select a desired deletion function at one time.

Meanwhile, even though the user receives the deletion items related to the Backspace key and the Delete key through the one area (i.e. the deletion mode entrance area 204) in FIG. 2, the user may receive a relevant deletion item through areas respectively corresponding to the Backspace key and the Delete key according to an embodiment of the present invention.

Now, a control process of performing the character deletion function according to an embodiment of the present invention will be described referring to FIG. 3 as follows.

Figure 3:
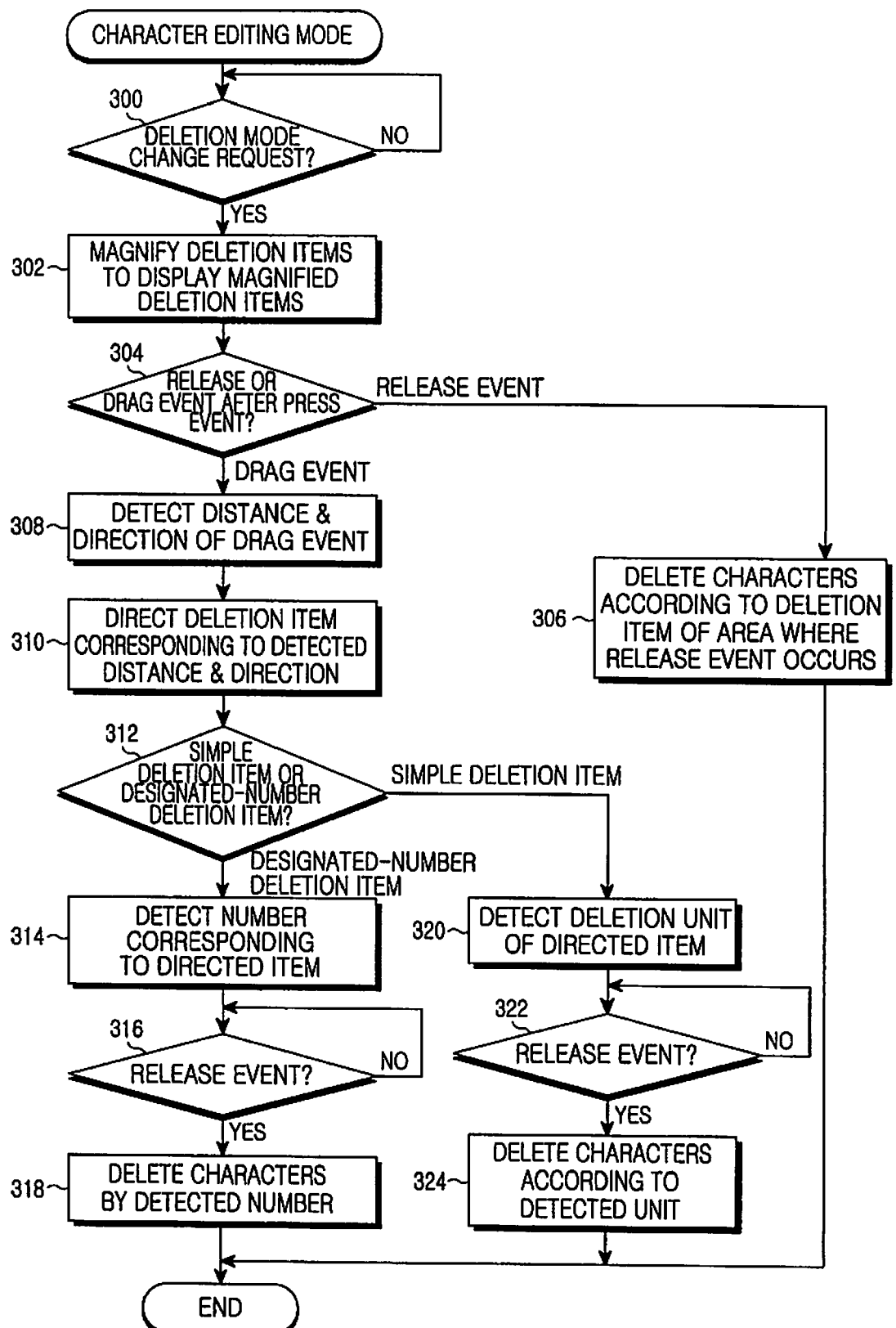
FIG. 3 is a flowchart illustrating a control process of performing the character deletion function according to an embodiment of the present invention.

Referring to FIG. 3, while performing a character deletion mode, the control unit 130 determines in step 300 if there is a request for entrance into the deletion mode (i.e. a deletion mode change request). When it is determined that there is the deletion mode change request, the control unit 130 proceeds to step 302, and magnifies deletion items to display the magnified deletion items.

According to an embodiment of the present invention, the deletion items includes at least one of a simple deletion item for deleting characters on a unit-to-unit basis and a designated-number deletion item for deleting the characters on a number-to-number basis. Herein, the simple deletion item includes at least one of an item for deleting the characters on a word-to-word basis, an item for deleting the characters on a line-to-line basis, and an item for deleting the total characters. Also, the designated-number deletion item includes at least one of at least one reverse deletion item for deleting characters on the left side of a current cursor location designated-number by designated-number and at least one forward deletion item for deleting characters on the right side of the current cursor location designated-number by designated-number.

Figure 4A:
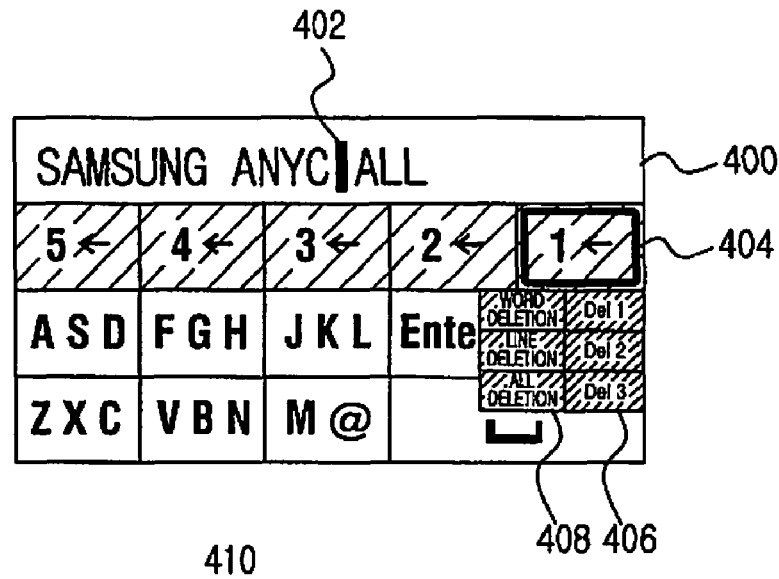
FIGS. 4A, 4B and 4C are illustrative views showing screen images while performing the character deletion function according to an embodiment of the present invention.

The deletion items as described above are displayed in a magnified manner as illustrated in FIG. 4A. Specifically, first, a reverse deletion item 404 related to the Backspace key is displayed in a horizontal direction. In a vertical direction, the simple deletion item 408 is displayed along with a forward deletion item 406 related to the Delete key. In FIG. 4A, the reverse deletion item 404 is displayed in two or more character areas respectively assigned at least one character for character input, and the forward deletion item 406 and the simple deletion item 408 are displayed in a newly generated pop-up window. However, a scheme for displaying the deletion items in either the character areas or the pop-up window can be changed according to an embodiment of the present invention.

When the deletion items are displayed in a magnified manner as described above, the control unit 130 proceeds to step 304, and determines if a Release event occurs after a Press event or a Drag event occurs after the Press event. If it is determined that the Release event occurs, the control unit 130 proceeds to step 306, and deletes characters according to a deletion item of an area where the Release occurs.

Figure 4B:
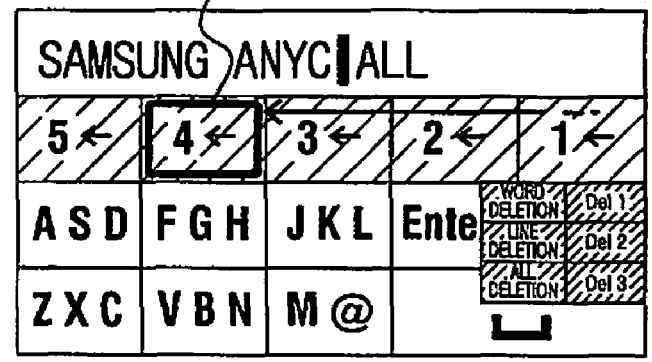

Referring to FIG. 4A, the user generates a Release event without the occurrence of a Drag event in a state where the deletion items are displayed in a magnified manner, and can delete characters in a deletion scheme corresponding to "1←" 404 in which the Release event occurs. Herein, "1←-" 404 is a reverse deletion item for deleting a character output on the left side of a location of a cursor 402. Accordingly, in an input editor window 400, a character "C" output on the left side of the cursor 402 is deleted, and the remaining characters are then displayed. Meanwhile, if it is determined that the Drag event occurs, the control unit 130 proceeds to step 308, and detects a distance and a direction of the Drag event. In step 310, the control unit 130 directs a deletion item corresponding to the detected distance and direction. FIG. 4B according to an embodiment of the present invention illustrates a case where the Drag event occurs on the left side of "1←" 404 (refer to FIG. 4A) in which the Press event starts, and "4←" 410 is then directed.

When any one of the deletion items is directed as described above, the control unit 130 determines in step 312 if the directed deletion item is a simple deletion item or a designated-number deletion item. If it is determined that the directed deletion item is the designated-number deletion item, the control unit 130 proceeds to step 314, and detects a number corresponding to the directed item. If it is determined in step 316 that a Release event occurs, the control unit 130 proceeds to step 318 and deletes characters by the detected number.

According to an embodiment of the present invention, the designated-number deletion item includes the reverse deletion item and the forward deletion item for which a number and a deletion direction of characters to be deleted are designated. Herein, since the reverse deletion item and the forward deletion item are designated in directions different from each other, displayed locations are also different from each other. Specifically, the reverse deletion item for deleting characters by a designated number on the left side of a current cursor location as the function of the Backspace key is displayed on the left side of an area where a Press event occurs. Also, the forward deletion item for deleting characters by designated-number on the right side of the current cursor location as the function of the Delete key is displayed below the area where the Press event occurs. Accordingly, the user can determine a direction in which characters are intended to be deleted in consideration of a location at which the relevant deletion item is displayed.

Figure 4C:
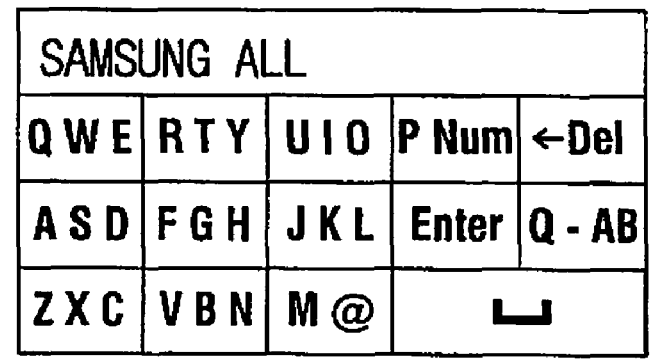

In the manner as described above, the control unit 130 determines the directed "4←" 410 (refer to FIG. 4B) as the designated-number deletion item, and detects a number of characters to be deleted. At this time, the control unit 130 detects a number of the characters to be deleted through the numeral "4" displayed in "4←" 410. This is because a numeral displayed in the designated-number deletion item signifies a number of characters to be deleted. Accordingly, when a Release event occurs in "4←" 410, four characters on the left side of a cursor location are deleted. Namely, in the input editor windows, "ANYC" is deleted, and only "SAMSUNG ALL" is then displayed, as illustrated in FIG. 4C.

Meanwhile, if it is determined in step 312 that the directed deletion item is the simple deletion item, the control unit 130 proceeds to step 320, and detects a deletion unit of the directed item. Then, the control unit 130 determines in step 322 if a Release event occurs. If it is determined that the Release event occurs, the control unit 130 proceeds to step 324, and deletes characters according to the detected deletion unit.

Specifically, the user generates a Drag event in "1←" 404 (refer to FIG. 4A) where the Press event starts, and selects a simple deletion item. The simple deletion item is an item provided so as to be able to delete characters either on a word-to-word basis, on a line-to-line basis, or for total characters as a unit according to an embodiment of the present invention.

If it is determined that the item for deleting the characters on a word-to-word basis is selected among them, the control unit 130 identifies a word in which the cursor is located, and deletes the identified word. Since the cursor is located in a word "ANYCALL" as illustrated in FIG. 4A, the relevant word "ANYCALL" is deleted. Accordingly, the user has convenience with which he/she can select a desired deletion unit and can more efficiently delete characters.

In the present invention as described above, when entering the deletion mode, various deletion schemes are provided, so that the character editing can be more efficiently performed. Also, in the present invention, the user has convenience with which he/she can select a character deletion direction depending on a direction of a Drag event so that he/she may efficiently select a deletion item.

Meanwhile, whenever a directed deletion item is changed according to an embodiment of the present invention, it may be possible to show a deletion process in response to the changed deletion item. For example, when a Drag event occurs in the order of "1←," "2←," "3←," and "477 ," a number of characters to be deleted sequentially increases. At this time, as a number of the characters to be deleted becomes sequentially larger, the more characters are deleted depending on a relevant number of characters to be deleted, and the remaining characters are then displayed in the input editor window.

In a similar manner, it is also possible to recover the characters by the number of the deleted characters and then display the recovered characters. For example, when a Drag event occurs again in a direction opposite to deletion order after deleting characters in the order of "1←," "2←," "3←," and "4←," the deleted characters are sequentially recovered, and the recovered characters are then displayed.

Also, in a different manner from that as described above, it is possible to delete or recover characters depending on a number of areas in each of which a Drag event occurs. Namely, according to an embodiment of the present invention, when a Drag event occurs in any one direction after a Press event occurs in any one of areas where deletion items are respectively displayed for each relevant direction, input characters can be deleted by a number of areas in each of which the Drag event occurs, which can then be displayed. When a Drag event occurs in a reverse direction in a state where the characters are deleted, it is possible to recover the deleted characters by a number of areas in each of which the reverse Drag event occurs and display the recovered characters.

When a directed deletion item is changed according to a Drag direction as described above, a deletion process or a recovery process corresponding to the changed deletion item is displayed in the input editor window. When a Release event occurs after the Drag event as described above, a deletion result corresponding to the directed deletion item is finally displayed. Accordingly, the user has convenience with which he/she can perform an accurate deletion function when editing characters.

According to the present invention as described above, various deletion schemes can be performed in a terminal equipped with a touch-screen. In addition, the present invention provides convenience with which a user can quickly perform a deletion function with minimum action.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for providing a character deletion function by a terminal equipped with a touch-screen, the method comprising the steps of;
    displaying a plurality of deletion items with designated respective deletion schemes when there is a request for a deletion mode while inputting characters,
    wherein the deletion items represent items for performing deletion functions corresponding to the deletion schemes which represent schemes for deleting the input characters based on a cursor location on the touch-screen;
    determining if a Drag event occurs, after a Press event occurs in an area where at least one of the plurality of deletion items is displayed;
    determining if a Release event occurs, when the Drag event occurs;
    deleting the input characters in a deletion scheme corresponding to one of the plurality of deletion items having an area where the Release event occurs, when the Release event occurs;
    calculating a number of areas through which a reverse Drag event occurs when the Drag event occurs in a reverse direction after the Drag event occurs; and
    recovering the deleted characters by the calculated number of areas and displaying the recovered characters.

2. The method as claimed in claim 1, wherein the plurality of deletion items comprise at least one of a simple deletion item for deleting characters on a unit-to-unit basis and a designated-number deletion item for deleting the characters on a number-to-number basis.

3. The method as claimed in claim 2, wherein the simple deletion item comprises at least one of an item for deleting the characters on a word-to-word basis, an item for deleting the characters on a line-to-line basis, and an item for deleting the total characters.

4. The method as claimed in claim 2, wherein the designated-number deletion item comprises at least one of at least one reverse deletion item for deleting characters on a left side of a current cursor location by designated-number, and at least one forward deletion item for deleting characters on a right side of the current cursor location by designated-number.

5. The method as claimed in claim 1, wherein the plurality of deletion items are displayed in either a plurality of character areas respectively assigned at least one character for character input, or a pop-up window.

6. An apparatus for providing a character deletion function, the apparatus comprising:
    a touch-screen for outputting characters input thereto, displaying a plurality of deletion items with respective designated deletion schemes in a deletion mode, and generating a Press event, a Release event, and a Drag event in response to an input of a user,
    wherein the deletion items represent items for performing deletion functions corresponding to the deletion schemes which represent schemes for deleting the input characters based on a cursor location on the touch-screen;
    a memory for storing therein deletion schemes respectively corresponding to the plurality of deletion items; and
    a control unit for controlling the touch-screen so that the plurality of deletion items are displayed on the touch-screen when there is a request for the deletion mode while inputting characters, determining if a Release event occurs when a Drag event occurs after a Press event occurs in an area where at least one of the plurality of deletion items is displayed, and deleting the characters output on the touch-screen in a deletion scheme corresponding to one of the plurality of deletion items having an area where the Release event occurs when the Release event occurs, calculating a number of areas through which a reverse Drag event occurs when the Drag event occurs in a reverse direction after the Drag event occurs, and recovering the deleted characters by the calculated number of areas and displaying the recovered characters.

7. The apparatus as claimed in claim 6, wherein, when there is the request for the deletion mode, the control unit displays at least one of a simple deletion item for deleting characters on a unit-to-unit basis and a designated-number deletion item for deleting the characters on a number-to-number basis.

8. The apparatus as claimed in claim 7, wherein the control unit displays, as the simple deletion item, at least one of an item for deleting the characters on a word-to-word basis, an item for deleting the characters on a line-to-line basis, and an item for deleting the total characters.

9. The apparatus as claimed in claim 7, wherein the control unit displays, as the designated-number deletion item, at least one of at least one reverse deletion item for deleting characters on a left side of a current cursor location by designated-number, and at least one forward deletion item for deleting characters on a right side of the current cursor location by designated-number.

10. The apparatus as claimed in claim 6, wherein the control unit displays the plurality of deletion items in either a plurality of character areas respectively assigned at least one character for character input, or a pop-up window.

11. A method for providing a character deletion function by a terminal equipped with a touch-screen, the method comprising the steps of;
    displaying a plurality of deletion items for deleting input characters by designated-number in a relevant direction when there is a request for a deletion mode while inputting the characters,
    wherein the deletion items represent items for performing deletion functions corresponding to deletion schemes which represent schemes for deleting the input characters based on a cursor location on the touch-screen;

calculating a number of areas through which a Drag event occurs when the Drag event occurs in any one direction after a Press event occurs in an area where at least one of the plurality of deletion items is respectively displayed for each relevant direction;

displaying a result of deleting the input characters by the calculated number of areas;

calculating a number of areas through which a reverse Drag event occurs when the Drag event occurs in a reverse direction after the Drag event occurs; and recovering the deleted characters by the calculated number of areas and displaying the recovered characters.

* * * * *